(12) United States Patent
Lloyd et al.

(10) Patent No.: US 8,760,392 B2
(45) Date of Patent: Jun. 24, 2014

(54) WIRELESS MOTION PROCESSING SENSOR SYSTEMS SUITABLE FOR MOBILE AND BATTERY OPERATION

(75) Inventors: Stephen Lloyd, Los Altos, CA (US); David Sachs, Sunnyvale, CA (US); David Devries, San Jose, CA (US); Doug Vargha, Palo Alto, CA (US); Derek Shaeffer, Redwood City, CA (US); Erik Anderson, San Francisco, CA (US); Kerry Keal, Santa Clara, CA (US); Nathan Royer, Cupertino, CA (US)

(73) Assignee: Invensense, Inc., San Jose, CA (US)

( * ) Notice: Subject to any disclaimer, the term of this patent is extended or adjusted under 35 U.S.C. 154(b) by 395 days.

(21) Appl. No.: 12/869,837

(22) Filed: Aug. 27, 2010

(65) Prior Publication Data

US 2011/0254760 A1 Oct. 20, 2011

Related U.S. Application Data

(60) Provisional application No. 61/326,022, filed on Apr. 20, 2010.

(51) Int. Cl.
*G09G 5/00* (2006.01)
*G06F 3/0346* (2013.01)
*G06F 19/00* (2011.01)
*A63F 13/06* (2006.01)
*G01P 15/00* (2006.01)

(52) U.S. Cl.
CPC .......... *G01P 15/00* (2013.01); *A63F 2300/105* (2013.01); *G06F 3/0346* (2013.01); *A63F 2300/1006* (2013.01); *G06F 19/00* (2013.01); *A63F 13/06* (2013.01); *A63F 2300/1031* (2013.01); *G09G 5/00* (2013.01)
USPC .......................................................... 345/156

(58) Field of Classification Search
USPC ........... 348/14.05, 114, 211.99, 211.1–211.7, 348/734; 345/156
See application file for complete search history.

(56) References Cited

U.S. PATENT DOCUMENTS

| | | | |
|---|---|---|---|
| 5,453,758 A * | 9/1995 | Sato | 345/158 |
| 6,128,955 A * | 10/2000 | Mimura | 73/510 |
| 7,180,500 B2 | 2/2007 | Marvit et al. | |
| 7,318,349 B2 * | 1/2008 | Vaganov et al. | 73/514.33 |

(Continued)

FOREIGN PATENT DOCUMENTS

EP 0429391 B1 8/1995

OTHER PUBLICATIONS

Cho, et al. Dynamics of Tilt-based Browsing on Mobile Devices. CHI 2007, Apr. 28-May 3, 2007, San Jose, California, USA. pp. 1947-1952.

Primary Examiner — Kent Chang
Assistant Examiner — Nathan Brittingham
(74) Attorney, Agent, or Firm — Maryam Imam; IPxLaw Group LLP

(57) ABSTRACT

The present invention relates to a combination of a 6-axis motion sensor having a 3-axis gyroscope and a 3-axis linear accelerometer, a motion processor and a radio integrated circuit chip (IC), wherein the intelligence in the motion processor enables the communication between the motion sensor, the radio IC and the external network. The motion processor also enables power savings by adaptively controlling the data rate of the motion sensor, depending on the amount or speed of the motion activity.

26 Claims, 13 Drawing Sheets

(56) References Cited

U.S. PATENT DOCUMENTS

| | | |
|---|---|---|
| 7,333,087 B2 | 2/2008 | Soh et al. |
| 7,508,384 B2 | 3/2009 | Zhang et al. |
| 7,738,611 B2 * | 6/2010 | Detwiler .................. 375/354 |
| 7,764,958 B2 * | 7/2010 | Townsend et al. ............ 455/423 |
| 2004/0239482 A1 * | 12/2004 | Fitzgibbon .................. 340/5.61 |
| 2005/0110778 A1 | 5/2005 | Ben Ayed |
| 2006/0061545 A1 | 3/2006 | Hughes et al. |
| 2006/0139327 A1 | 6/2006 | Dawson et al. |
| 2006/0164382 A1 | 7/2006 | Kulas et al. |
| 2006/0189902 A1 * | 8/2006 | Takai et al. .................. 600/595 |
| 2007/0005246 A1 * | 1/2007 | Kappi .......................... 701/214 |
| 2007/0024581 A1 * | 2/2007 | Kim et al. ..................... 345/156 |
| 2007/0049374 A1 * | 3/2007 | Ikeda et al. ..................... 463/30 |
| 2007/0176898 A1 | 8/2007 | Suh |
| 2008/0079594 A1 * | 4/2008 | Tronconi et al. ............. 340/669 |
| 2008/0134784 A1 * | 6/2008 | Jeng et al. ................. 73/514.01 |
| 2008/0140338 A1 * | 6/2008 | No et al. ....................... 702/141 |
| 2008/0204413 A1 * | 8/2008 | Wu et al. ....................... 345/161 |
| 2008/0291163 A1 * | 11/2008 | Liberty ........................ 345/156 |
| 2009/0027341 A1 * | 1/2009 | Arrigo et al. ................. 345/165 |
| 2009/0088204 A1 | 4/2009 | Culbert et al. |
| 2010/0056054 A1 * | 3/2010 | Yamato et al. ............... 455/41.2 |
| 2010/0188331 A1 * | 7/2010 | Wehrenberg et al. ......... 345/156 |
| 2010/0321291 A1 * | 12/2010 | Kabasawa et al. ............ 345/157 |

* cited by examiner

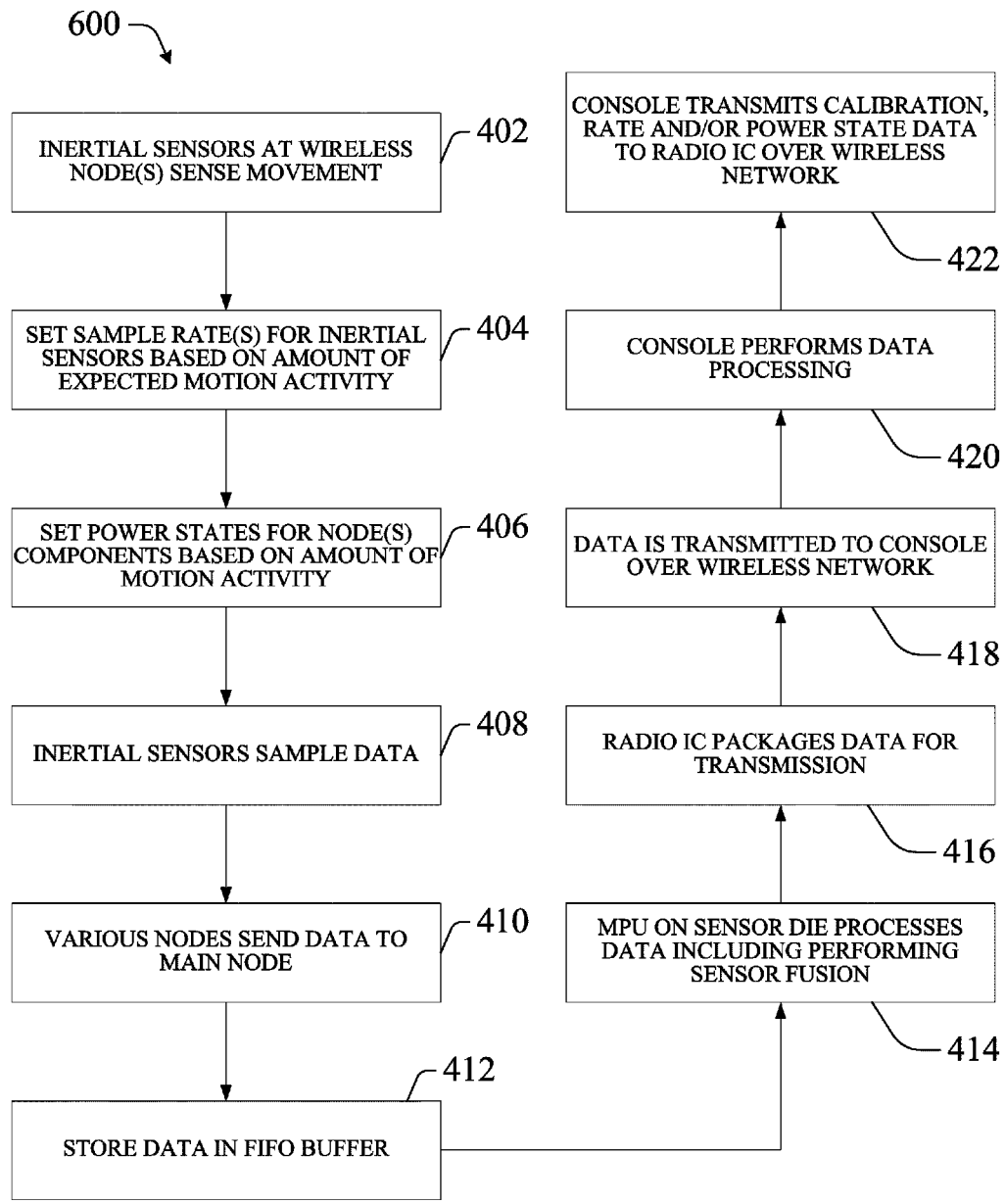
Figure 4    EXAMPLE METHODOLOGY

WIRELESS MOTION PROCESSING SENSOR SYSTEMS SUITABLE FOR MOBILE AND BATTERY OPERATION

PRIORITY CLAIM

This application claims the benefit of U.S. Provisional Patent Application 61/326,022, filed Apr. 20, 2010, and entitled "WIRELESS MOTION PROCESSING SENSOR SYSTEMS SUITABLE FOR MOBILE AND BATTERY OPERATION", the entirety of which is incorporated by reference herein.

FIELD OF THE INVENTION

The present invention relates to handheld devices including remote controllers for video gaming systems, PDAs, audio/video devices, mobile phones, MP3 players, laptops, smart phones, watches and the like.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIG. 4 illustrates an exemplary methodology of the present invention;

DETAILED DESCRIPTION

Figure 1:
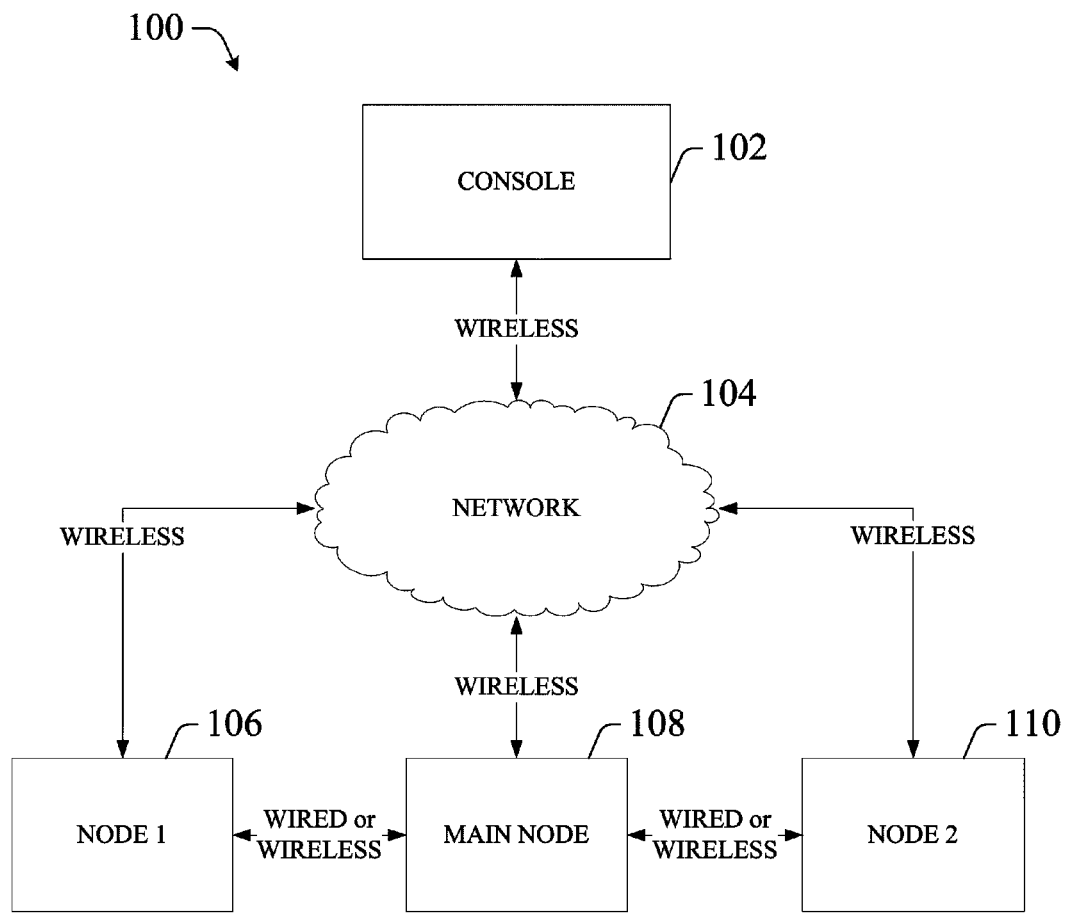
FIG. 1 illustrates an exemplary system of the present invention.

Embodiments of the present invention disclose systems and techniques for managing interactions between a console and one or more remote nodes having motion sensing, motion processing and wired or wireless communication capability. Embodiments of the present invention provide for enhanced power management by adaptively adjusting data sampling and transmission rates for various components based on the requirements of the task at hand. Embodiments of the present invention disclose a remote handheld device node having 6-axis motion processor consisting of 3-axis of angular rate sensing and 3 axis of linear acceleration sensing combined with motion processing intelligence and a radio IC. The techniques of the present invention minimize power consumption by controlling the data rate of the sensor output, including a mode of zero data rate wherein the radio does not transmit any data for an extended period of time, based on the activity measured on one or more of the sensor axis. The motion processing intelligence can be implemented inside the sensor module, the radio IC, or both. Inside the radio IC, the motion processing intelligence can be implemented inside a microprocessor and/or by using digital logic. The motion processing intelligence can also be implemented inside a base station, with which the radio IC can communicate in a wireless manner.

In various embodiments of the present invention, the interface between the sensor module and the radio IC can include a single bit stream, for example, a single bit stream from a sigma-delta converter consisting of data from each individual sensor, or a 4 dimensional quaternion derived from combining outputs from one or more sensors. According to an aspect of the present invention, in some embodiments, the frequency of the clock used in the sensor module is estimated by using the more accurate clock on the radio IC or the more accurate clock in the base station. Moreover, the motion processor clock can use the estimate of its internal clock frequency provided by the base station to adjust its clock and provide an accurate clock which can be used by the radio IC, thereby removing the need for an external crystal oscillator typically used by radio ICs.

According to an aspect of the present invention, the sensor module can be set to a mode in which, instead of sending raw sensor data, the sensor module can send a single digital word and time stamp which identifies a predefined gesture or movement. Moreover, the sensor module can send an interrupt to the radio IC to indicate a gesture or movement has occurred and the radio IC can read the digital word from a pre-defined register in the sensor module. Alternatively, the sensor module can send gesture data to the radio IC as gestures are detected.

According to an aspect of the present invention, the sensor module, the radio IC and/or its connected data communications network can automatically identify and register the sensor module into the network database by recognizing its model, its device address, its parameter settings, and current power or active/sleep state. In one embodiment of the present invention, the sensor module can be included and connected as a one of two or more network-elemental devices communicating with a private a public interact-protocol data network, connected via the radio. In another embodiment of the present invention, the sensor module can be connected to and communicate with one other remote terminal via the radio IC.

According to an aspect of the present invention, in some embodiments, sensor or radio data output can be compressed using linear time-invariant or non-linear digital bandwidth compression, but whose algorithm is specific to preserving the motion sensing fidelity to a degree which varies according to the requirement of its end application. The compression algorithm can be realized as part of the sensor, or part the radio or be partitioned in some way between the two. An advantage of linear time-invariant digital bandwidth compression is that it can permit a fixed ratio of data bandwidth compression between the native or raw motion sensed signal and the final compressed data signal. Examples of motion signal types which benefit from this compression can include any fixed-precision constant data-rate signal like raw sensor data or quaternion component data.

The principle and practice of linear and non-linear digital bandwidth compression is widely known to persons skilled in the art of data communications system design. However, the problem of applying this compression to motion sensing is that the system must be designed specifically to preserve a desired degree of fidelity for a variety of sensed motion types and dynamics. In one embodiment of the present invention, the voice-telephony standard PCM compression algorithms or any other commonly used public open standard algorithm can be applied to any and all sensed motion types and dynamics. With respect to non-linear digital bandwidth compression, examples of this technique include using the international standard u-Law or A-law digital-voice PCM data compression or code-excited linear prediction (CELP), causing the number of bits transmitted per second by the sensor to be uniformly reduced by the factor available from the compression algorithm regardless of the motion type or dynamic. In another embodiment of the present invention, a custom-designed digital bandwidth compression reduction factor may be designed for a specific motion type and dynamic.

In an embodiment of the present invention, with respect to the linear time-invariant digital bandwidth compression, popularly employed code-lookup table algorithms such as CELP or VCELP can be applied. In another embodiment of the present invention, a custom-designed compression algorithm can be designed to specifically address the quantized signal precision from the sensor, so that bursts of fast motion will quantize to a difference data precision compared with periods of slow or no motion.

According to an aspect of the present invention, the sensor or radio data output can be compressed by using a rate and time-variant digital bandwidth compression technique, whose algorithm is specific to preserving the motion sensing fidelity to a degree which varies according to the requirement of its end application. The compression algorithm may be realized as part of the sensor, or part the radio or be partitioned in some way between the two. The problem of applying this compression to motion sensing involves understanding and quantifying the signal dynamics for various types of sensed motion. It is a general principle that rate and time-variant digital bandwidth compression offers the largest reduction for signals with large entropy, where signal entropy is classically defined as the peak variation in energy compared with its average energy per unit time. Time or rate-variant data compression can provide near-optimal bandwidth, to precisely achieve a desired tradeoff between the sensor output signal entropy and the required signal fidelity.

Examples of motion signals with large entropy, that will likely benefit from aggressive variable-rate compression include bursts of fast motion followed by periods of small motion such as sensor output stimulated by some types of dancing, or playing baseball, or golf, and others. Therefore a set of motion sensed signals can be quantified and assigned to an associated entropy figure given the type of motion involved, and that entropy figure will permit the optimal rate and time-variant digital bandwidth compression to be applied.

According to an aspect of the present invention, the sensor module can operate to control the total average power required for the sensors and/or the radio. The sensor module can affect power control of the sensors and/or the radio by responding to motion, or using its internal clock, or using any other applicable technique to ensure the most efficient use of battery or DC power. Popularly-deployed RF network standards such as Zigbee, RF4CE, 802.15.4, Bluetooth, and others offer power management features such as selectable radio transmit power, modulation symbol type, and timeslot or data rate/bandwidth. Methods to control total average power can include techniques such as varying the sensor and/or the radio transmitted or received data speed or bandwidth, or changing the sensor or the radio DC power drain mode between normal active mode and high or low DC power modes, to sleep or standby modes, or else by changing the radio frequency modulation or data symbol rate and scheme, or else by changing the time-slot duration and period with which the sensor and radio are connected to communication network.

In one embodiment of the radio and/or sensor power control method of the present invention, upon sensing any motion or any specifically-defined motion, the sensor module can wake up itself and/or the radio from standby or very low power 'sleep' state to its active operating state, or else do the reverse. In another embodiment of the present invention, the sensor module can utilize an internal clock to regularly change the sensor and/or radio's power state. In another embodiment of the present invention, the data communications network that the radio connects to can interrogate the sensor via the radio and issue commands to the radio for the purpose of control the power state or modulation type of the radio and/or the sensor while connected to the network.

According to an aspect of the present invention, the sensor module and/or the radio can operate to control or select the sensors output signal or data format, computed parameters and/or characteristics. For example, the sensors output signals may be controlled or selected to provide a variety of digital data-rates, low or high-pass filter characteristics, full scale ranges, bias offset settings, data converter dynamic range settings, and others. In another example, the sensor can be controlled or selected by itself or by the radio to provide a variety of computed motion data formats and symbols which can include rotational matrix, Euler angles or quaternion components, raw sensor outputs, sensor temperature output, and so on.

The claimed subject matter is now described with reference to the drawings, wherein like reference numerals are used to refer to like elements throughout. In the following description, for purposes of explanation, numerous specific details and examples are set forth in order to provide a thorough understanding of the subject innovation. It is to be appreciated, however, that the subject innovation may be practiced without these specific details and is not limited by these specific details and examples. Also, well-known structures and devices are shown in block diagram form in order to facilitate describing the claimed subject matter.

The term "handheld device," as used in this disclosure, includes devices that can be held in a user's hand and also devices that are wearable on the user's body, for example, a wrist watch or a musical device that can be secured to the user's belt. Also, as used in this disclosure, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" and "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 illustrates an exemplary system in which the techniques of the present invention can be implemented. The system 100 includes a console 102, a wireless network 104, nodes 106 and 110 and the main node 108. The main node 108 is communicably coupled to the nodes 106 and 110 by way of a wired or wireless interface or both. In one embodiment of the present invention, the system includes a set of wireless sensor nodes 106, 108 and 110, in which each node 106, 108 or 110 can include some or all of the following components: a three-axis gyroscope, a three-axis accelerometer, a radio, a battery, a computation unit, a memory buffer, and a radio integrated circuit chip (IC). In one embodiment of the present invention, the node 106, 108 or 110 can also include a compass, a camera, ultrasonic transmitter and receiver, an infrared camera, and/or other type of motion tracking sensor. The nodes 106, 108 and/or 110 may not all have radios, but can be connected to each other by wires, such that only one of the motion tracking nodes 106, 108 or 110 includes a radio.

Figure 2:
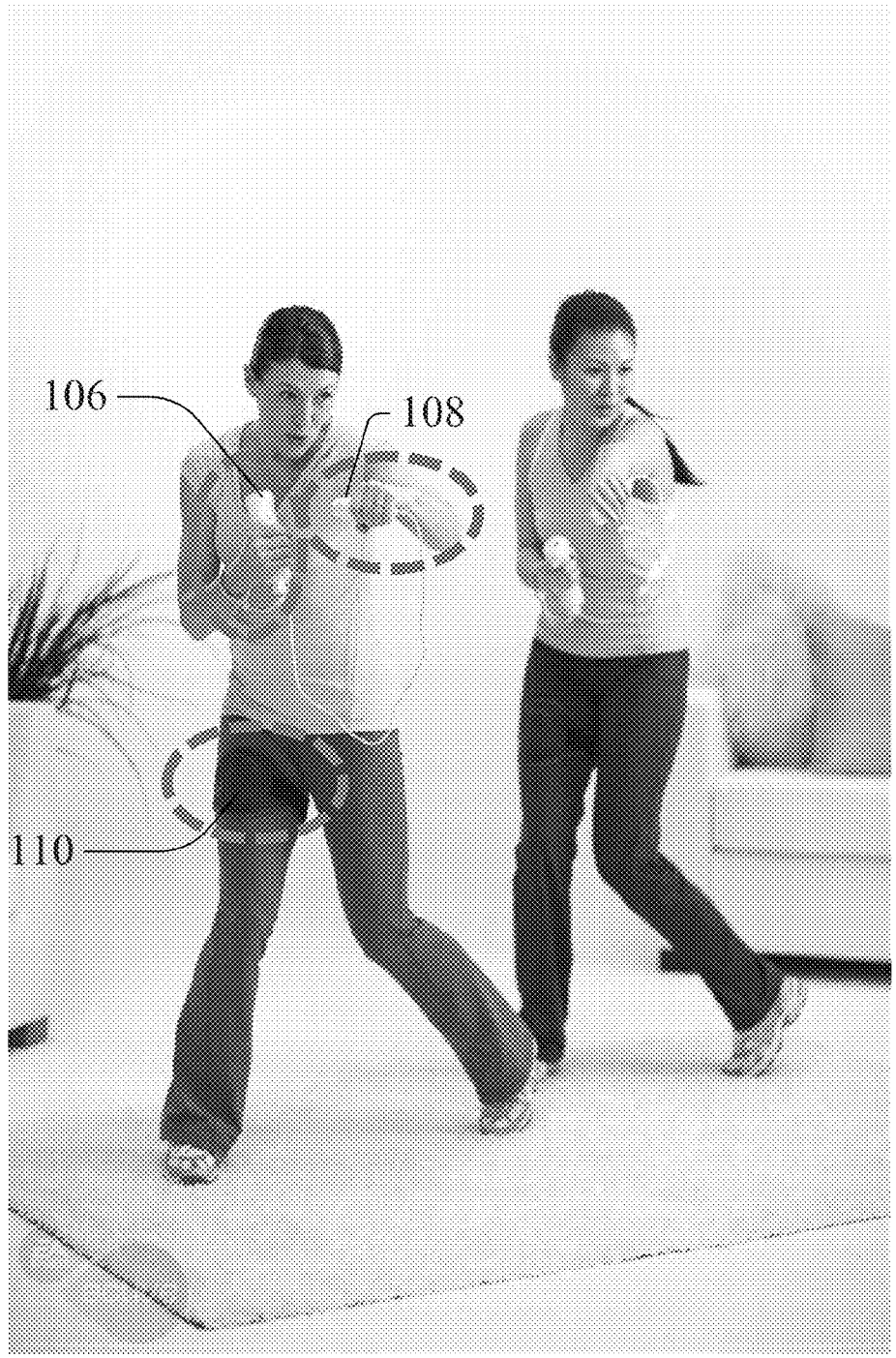
FIG. 2 illustrates an exemplary embodiment of the user wearable nodes of the present invention.

The radio(s) can transmit data to an external system that can include a game console 102, a PC, a TV, a handheld device or some other system that allows the user to view the data transmitted by the sensor nodes 106, 108 and/or 110. The radio transmission can also include data sent back from the console 102 to the sensor nodes 106, 108 and 110, and data sent from the sensor nodes 106, 108 and 110 to other sensor nodes 106, 108 and 110. As illustrated in FIG. 2, the wireless sensor nodes 106, 108 and 110 can form a wearable network such that they are distributed across a user's body; for example, with one on the user's hip, one on each foot, one on each wrist (106, 108), one on a thigh (110) or some other similar configuration. The system can involve multiple sets of wireless sensor nodes for multiple users. The radio can include AM, FM, Bluetooth, Zigbee, or some other RF interface. Also, infrared signals can be used to transmit data, instead of RF signals.

The sensor fusion algorithm can be executed partly on the sensor nodes 106, 108 and/or 110 and partly on the console 102. For example, a baseline quaternion can be formed on the nodes 106, 108 and/or 110 without any node 106, 108 or 110 having knowledge of the movement of other nodes 106, 108 and/or 110. The console 102 can correct those quaternions using data from other sensors such as infrared cameras or video cameras. The console 102 can also correct those quaternions using knowledge of human kinematics, for example, the maximum angle through which a joint may rotate can limit the final angle that is possible. The correction can also be done on a main sensor node 108 that has additional processing capabilities beyond that of the smaller nodes 106 and 110.

The additional constraints provided by the total available information can allow certain other aspects of the sensor fusion to be done more accurately off the sensor nodes 106, 108 and 110; for example, additional calibration of the sensors such as the sensor biases and sensitivities can be done off the sensor nodes 106, 108 and 110, using the additional information from infrared sensors, camera, or joint movement constraints. These calibration parameters can then be radioed back to the sensor nodes 106, 108 and/or 110 to improve their internal sensor fusion capabilities. In one embodiment of the present invention, the sensor nodes 106, 108 and 110 can be plugged into the game console 102 in order to charge them, and/or send additional information such as synchronizing clocks and calibrating clocks or MEMS resonators inside the sensor nodes 106, 108 and 110.

Figure 3A:
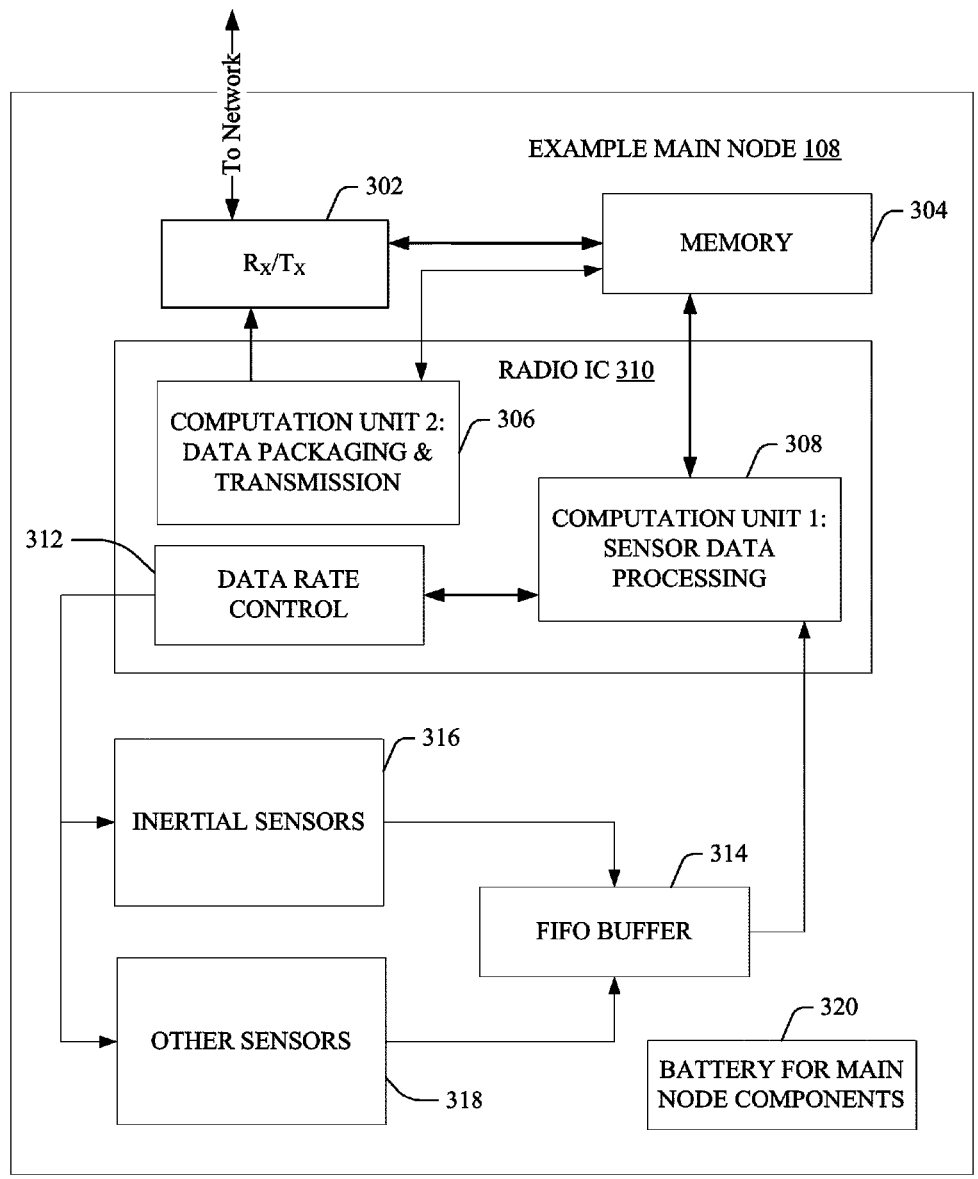
FIGS. 3a, 3b and 3c illustrate exemplary functional block diagrams for a node of the present invention.
Figure 3B:
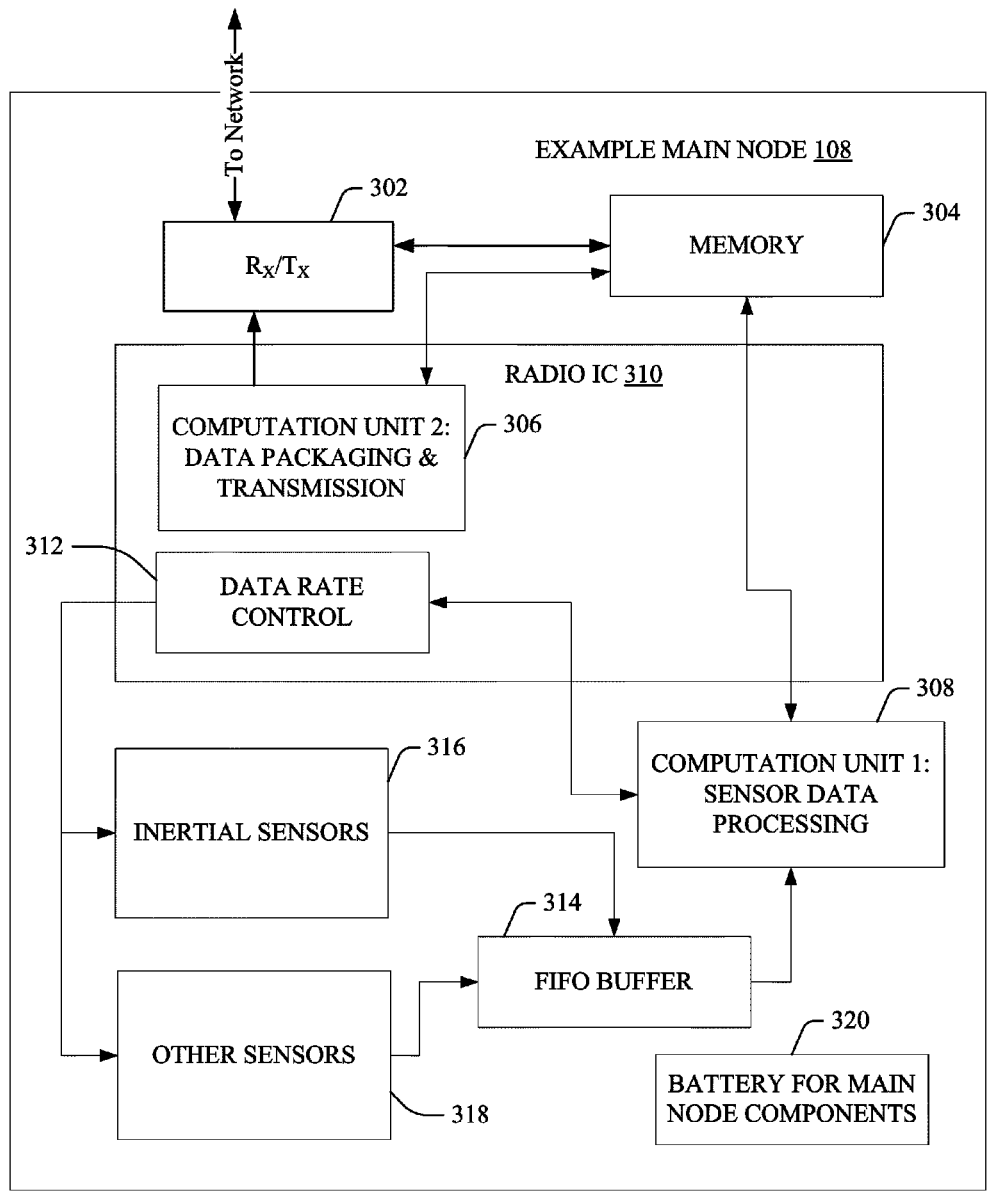
Figure 3C:
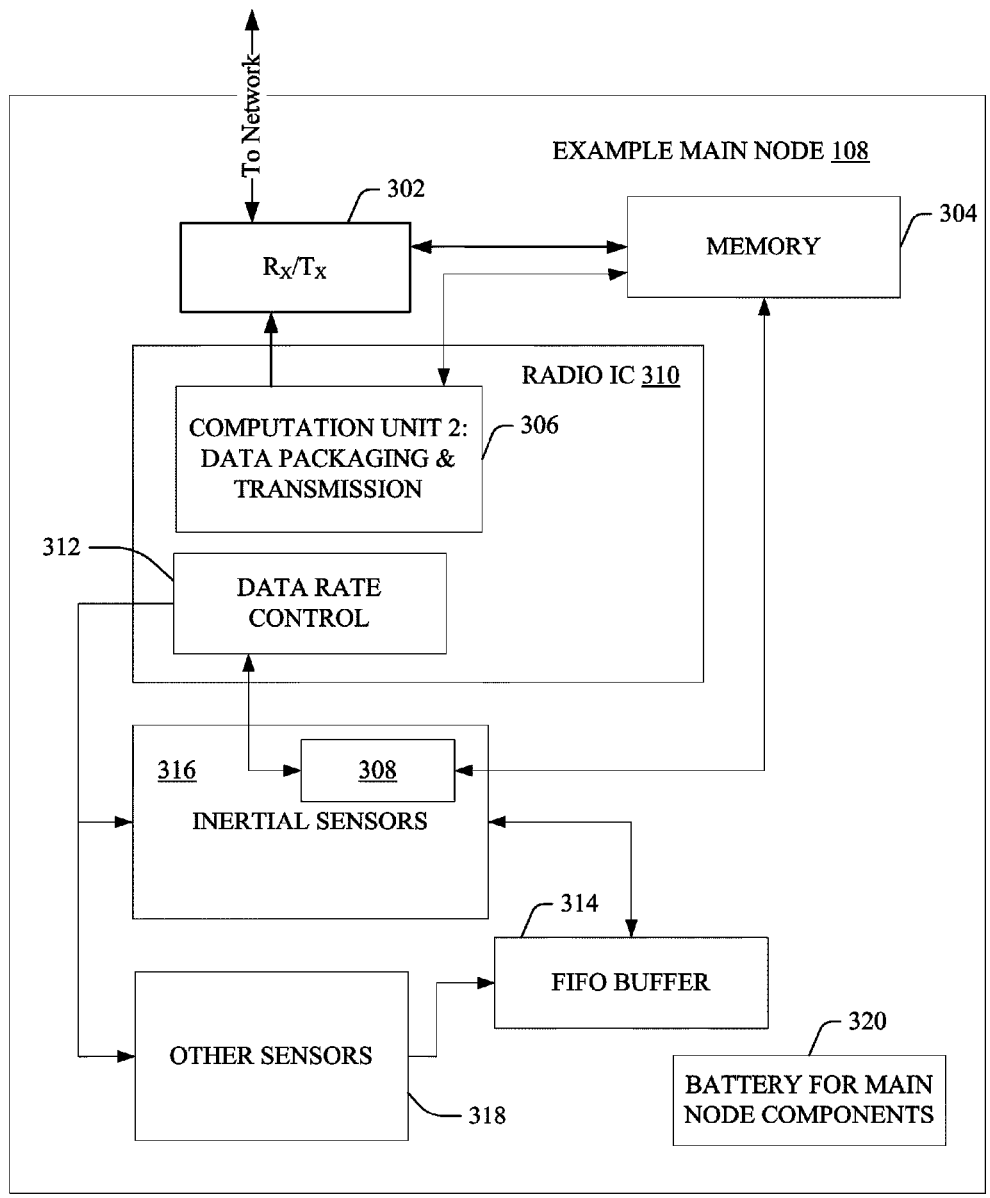

FIGS. 3a, 3b and 3c illustrate exemplary functional block diagrams for the node 108. The node 108 includes the receiver/transmitter module 302 coupled to the network 104, the Radio IC 310, the inertial sensors module 316, the other sensors 318 and the battery 320. The sensors modules 316 and 318 are coupled to the FIFO buffer 314. The computation unit 1 308 processes the data provided to the FIFO buffer 314 by the sensors modules 316 and 318. The computation unit 1 308 can be located inside the Radio IC 310 (FIG. 3a), outside the Radio IC 310 (FIG. 3b), inside the inertial sensors module 316 (FIG. 3c), or partially inside the Radio IC 310 and partially inside the inertial sensors module 316. The computation unit 1 310 controls the data rate control module 312, which adjusts the data sampling rate for the sensors modules 316 and 318. The data processed by the computation unit 1 308 is stored in the memory 304. The computation unit 2 306 packages the data in the memory 304 and prepares it for transmission to the other nodes 106 and 110 or the console 102. The computation unit 2 306 can be located inside or outside the Radio IC 310. In an embodiment of the present invention, the wireless sensor node 108 can include a MEMS resonator capable of maintaining an adequate clock for controlling the sample rate of the sensor data. The resonator can also be used for controlling the higher frequency timing of the radio itself, for example, for the frequencies generation within a Bluetooth module. The resonator can be included inside the same package as some or all of the motion sensors 316, 318. The resonator can be the same one as one of the resonators of a gyroscope. The nodes 106 and 110 can include some or all the components shown in FIG. 3.

According to an aspect of the present invention, the node 108 includes a 6-axis inertial sensor 316 consisting of 3-axis of angular rate sensing and 3-axis of linear acceleration sensing combined with motion processing intelligence 306 and 308, specifically optimized for a low cost battery operated wireless handheld device. According to an embodiment of the present invention, the motion processing intelligence 306, 308 includes the capability to perform the following tasks: store several samples of sensor data into a memory, combine 3-axis, 6-axis or 9-axis data into a 4 dimensional quaternion format (fusion matrix), perform low pass filtering, perform data averaging, decimate a higher sensor sample rate into a lower sample rate, adjust the resolution of the sensor output, pause the sensor output, and put the radio into an active or standby mode based on the activity measured on one or more of the sensor axes. The intelligence in the motion processor 306, 308 eliminates the need for a separate micro-controller or processor inside the sensors module 316 or the radio IC 310.

FIG. 4 illustrates an exemplary flow diagram for a methodology of the present invention. At Step 402, the inertial sensors embedded in the node sense movement of the handheld device including the node. The determination of the device's motion may be used to determine the rate at which data is sent, the type of data sent, the compression level or packet structure, and the power state of other devices in the sensor node or in other sensor nodes. For example, the radio and any computation unit used to handle data transmission can be powered down whenever no data is being sent. The motion processing computation unit can determine, based on the motion, when to wake up the radio. This can be done by using an interrupt signal from the motion processing computation unit. In some cases, the radio can be woken up at a regular rate, but the data type and compression level can be controlled by a separate motion computation unit which can be powered on more often.

At Step 404, the computation unit sets the data sampling rate(s) for the inertial sensors based on the expected amount of motion activity. In an embodiment of the present invention, a FIFO buffer can store sensor data at some rate higher than the rate at which the sensor data is to be transmitted. A motion algorithm running on a computation unit can be applied to the sensor data to determine the rate of movement of the device and, based on that, compress the data to reduce the bandwidth. For example, the algorithm can be used to detect the rate of rotation or linear movement based on raw data from a gyroscope, accelerometer, or other sensor, and to determine the ideal sample rate based on a lookup table or function. When the motion includes high frequency information, for example, if the user is moving quickly while executing a sports movement such as swinging a golf club or baseball bat, the data can be buffered at a high rate and transmitted (sent) at a lower rate. This can cause the buffer to accumulate data and cause minor latency. However, when the movement subsides, after the swing, the following data buffering can be reduced to a rate lower than the rate at which data is being sent, allowing the buffer to empty.

In some cases, one data sampling rate may be required for mapping to an animation, and another rate may be required for determining the result of a movement. For example, in a baseball video game, when swinging a baseball bat, 50 Hz data may be sufficient for animating an avatar swinging a bat, but 1 kHz data may be required for determining the result of the swing. The 50 Hz data must arrive to the console with very low latency to provide a good animation. The 1 kHz data is only required to determine the direction that the ball travels after being hit, and may arrive with some higher latency. In this case, it may not be possible for the sensor node to determine in real time when the swing has begun. The sensor node can be responsible for buffering the 1 kHz data and sending it once the swing results have been determined. The 1 kHz data may be sent alongside the 50 Hz data such that the 50 Hz data is in real time, and the 1 kHz data is used for post-processing (meaning used more than 200 ms after the motion occurred).

At Step 406, the computation unit sets the power states for the various nodes based on the amount of motion activity. The computation units sets the power states such that the amount of power is proportional to the amount of motion activity, such that power is not wasted when the motion activity is minimal or zero. In some cases, some or all of the motion sensors can be powered off or set in different power modes depending on the motion. For example, if the no motion is detected, only the accelerometer can be powered on. If only a small amount of motion is detected, the motion sensors can be duty cycled or left in various power states. For example, in cases in which not all gyro axes are required, the axes that are not required can be powered off. If different axes are required at different orientations, the required axes can be powered on while the axes not required can be powered off. The sensors can be left in a lower power state until a fast motion is about to occur that must be analyzed with more precision, at which point, the sensors can be switched to a higher or full power state. In some cases, some wireless sensor nodes may determine that other sensor nodes should change their mode or power state. For example, when a user performs a swinging action, a particular sensor node may be more accurate at determining that the data sampling rate must change than some other sensor node. In this example, the node that determines that the rate must increase can send messages to the other nodes to also increase their rates.

At Step 408, the inertial sensors sample data related to the motion. At Step 410, the data sampled by the various nodes is transmitted to the main node. At Step 412, the data is stored in a FIFO buffer of the main node. In one embodiment, the motion algorithm that determines the rate at which data should be sampled and sent can run at a high rate, such as 100 Hz to 1 kHz. The rate at which data is sent can be fixed at a lower rate, such as 20 Hz to 200 Hz. The motion algorithm and/or buffer can maintain a balanced flow of data such that when 1 kHz data rate is required, the buffer starts to fill up, but when only 20 Hz data rate is required, the buffer empties. The rate at which data is transmitted can be variable, depending on the rate at which data must be sent for the task at hand. If the required sensor data rate is 200 Hz, for example, the transmitter can only transmit every 20 ms, and send 4 data packets each time it transmits.

When the required data rate is 1 kHz, the transmitter can transmit every 50 ms, and send 10 packets each time it transmits. In this case, since the transmission data rate would be only 200 Hz total, the buffer would start to fill up. However, since humans are not capable of maintaining such a high rate of motion for long periods of time, this buffer could empty when the motion slowed down. In some cases, the data rate may slow to zero if there is no significant detected motion. In other cases, the minimum data rate can be fixed. These are only examples of how the transmitted data rate and packet size can vary based on the detected motion. The actual data rates and packets sizes would be optimized based on the available bandwidth, required battery life, and number of users.

At Step 414, the computation unit inside the radio IC processes the data in the FIFO buffer. At Step 416, the computation unit inside the radio IC packages the processed data for transmission. The radio IC can include two computation units, one for processing sensor data and determining the power state of other components of the system, and a second computation unit, which is powered on at a lower rate, for handling other computation tasks including packaging and transmission of the sensor data via the radio. In one embodiment, the motion computation unit can generate data from the raw sensor data, including low-pass filtered sensor data, or new data based on fusing the old data. For example, the computation unit can generate a quaternion, rotation matrix, or set of Euler angles determining the orientation of the device from gyroscopes, accelerometers, and other motion sensors, and this fused data can be transmitted in addition to or in place of the raw sensor data.

The data generated by the computation unit can include angular velocity data derived from multiple types of sensors, or linear acceleration, velocity, or position data derived from multiple types of sensors. The data can be transmitted in a coordinate system other than the coordinate system of the raw sensors. For example, the linear acceleration can be transmitted in a coordinate system relative to the Earth rather than the coordinate system relative to the motion sensors. The data can be compressed in various ways, including sending the difference between the current data and the previous data.

The computation unit can generate multiple streams of data low-pass filtered to different bandwidths, to prevent aliasing when different data rates are used. For example, if sensor data with a sample rate of 1 kHz must be sent, the bandwidth of the data can be less than 500 Hz. However, if the motion is slower and a sample rate of 50 Hz is sufficient, the bandwidth can be less than 25 Hz. The bandwidths may be changed on the fly, or the sensor data may be split into multiple streams at different bandwidths. For example, 1 kHz data with a 500 Hz bandwidth may be buffered alongside a 200 Hz data with a 100 Hz bandwidth, and 50 Hz data with a 25 Hz bandwidth. The appropriate data would be sent, depending on the amount of motion detected.

At Step 418, the radio IC transmits the data to the main console. At Step 420, the console performs further data processing. At Step 422, the console transmits calibration, sample rate, power state and/or clocking information to the node(s) over the wireless network. In some cases, the console can have some impact on the data rates sent by the wireless nodes. For example, in a baseball video game, if a user is taking practice swings, there would be no reason to increase the data rate yet, because the only requirement would be animating the baseball bat swing, not determining the result of the swing. The sensor nodes sending the swinging data would not be able to tell the difference, however, the console would have the information that no ball had been pitched yet, and therefore the swing must be a practice swing. When a ball is pitched, the console could send a message to the sensor nodes that the next swing is the real swing, and that a higher data rate would be required to determine the result of that swing.

Similarly, if one user is pitching and another user is hitting, only one of those users will require data sampling at a high rate at a given time. The console can determine that the pitcher requires a high rate. Once the pitcher has executed a pitching action, then the console can determine that only the batter (swinger) requires a high rate. The system can drop the rate of the pitcher and increase the rate of the hitter, maintaining the total system bandwidth. This determination can occur from the console, or can be sent directly from some sensor nodes to other sensor nodes.

Figure 5:
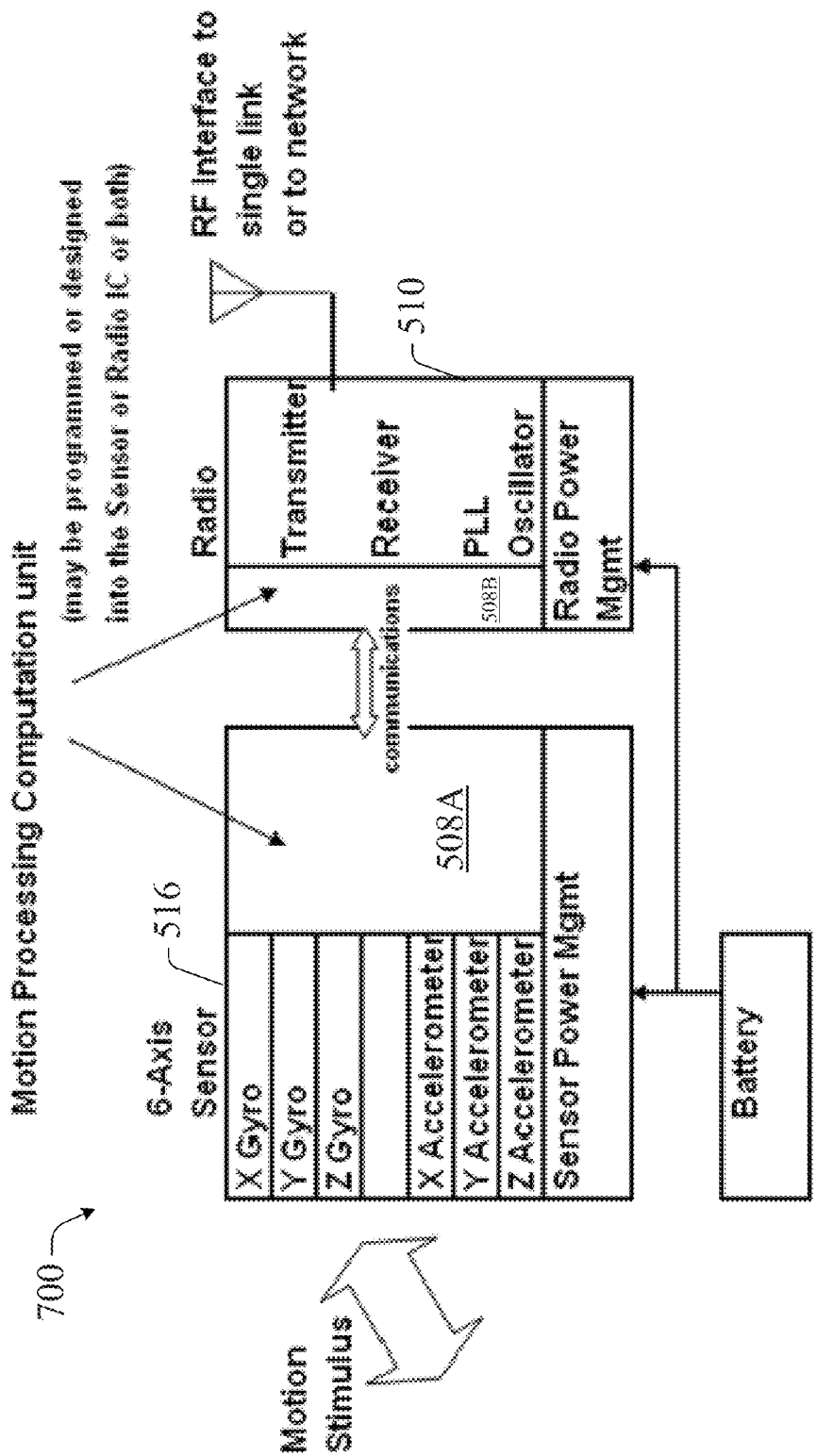
FIGS. 5, 6 and 7 illustrate exemplary implementations of the motion processing intelligence of the present invention.
Figure 6:
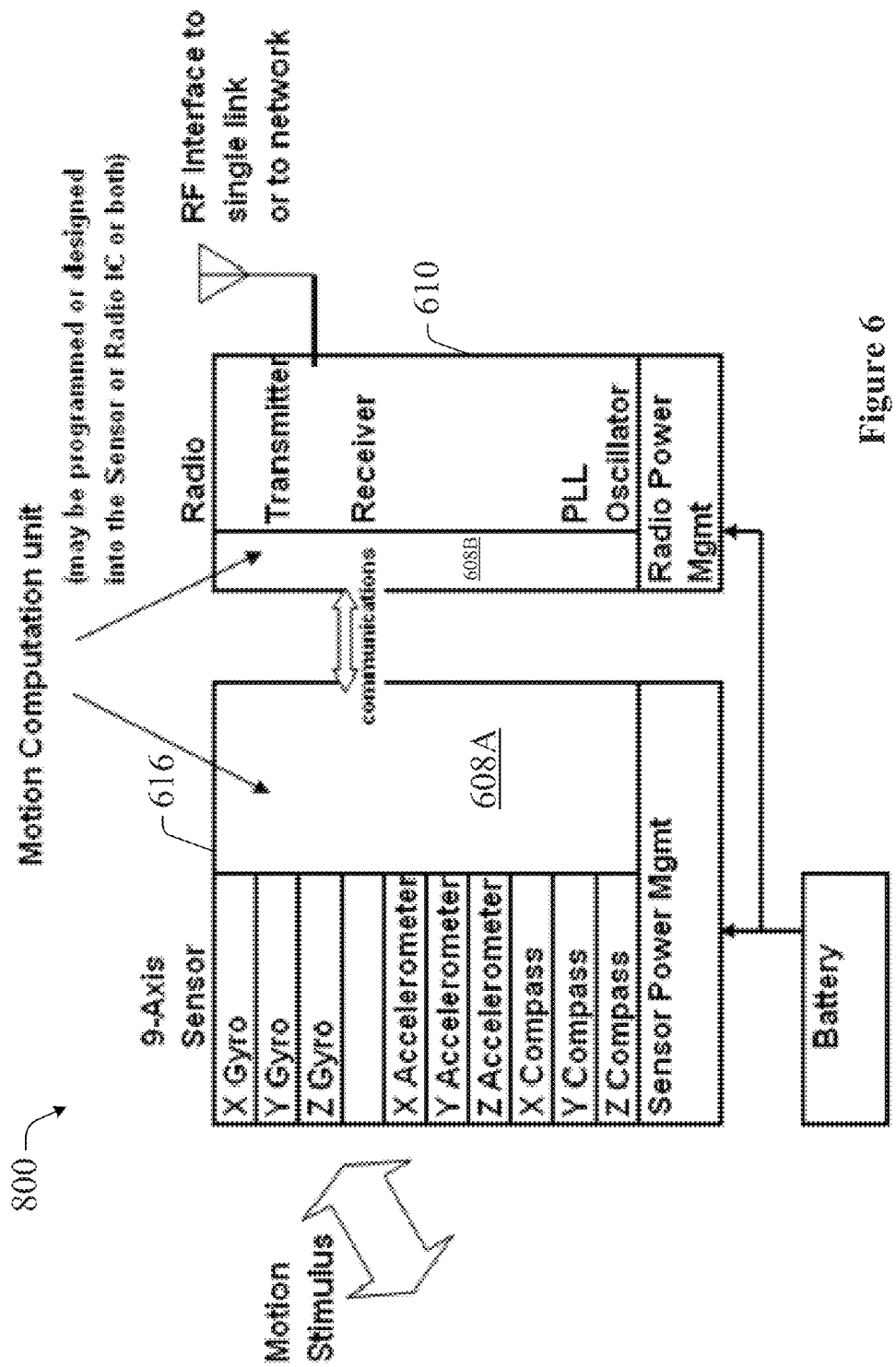
Figure 7:
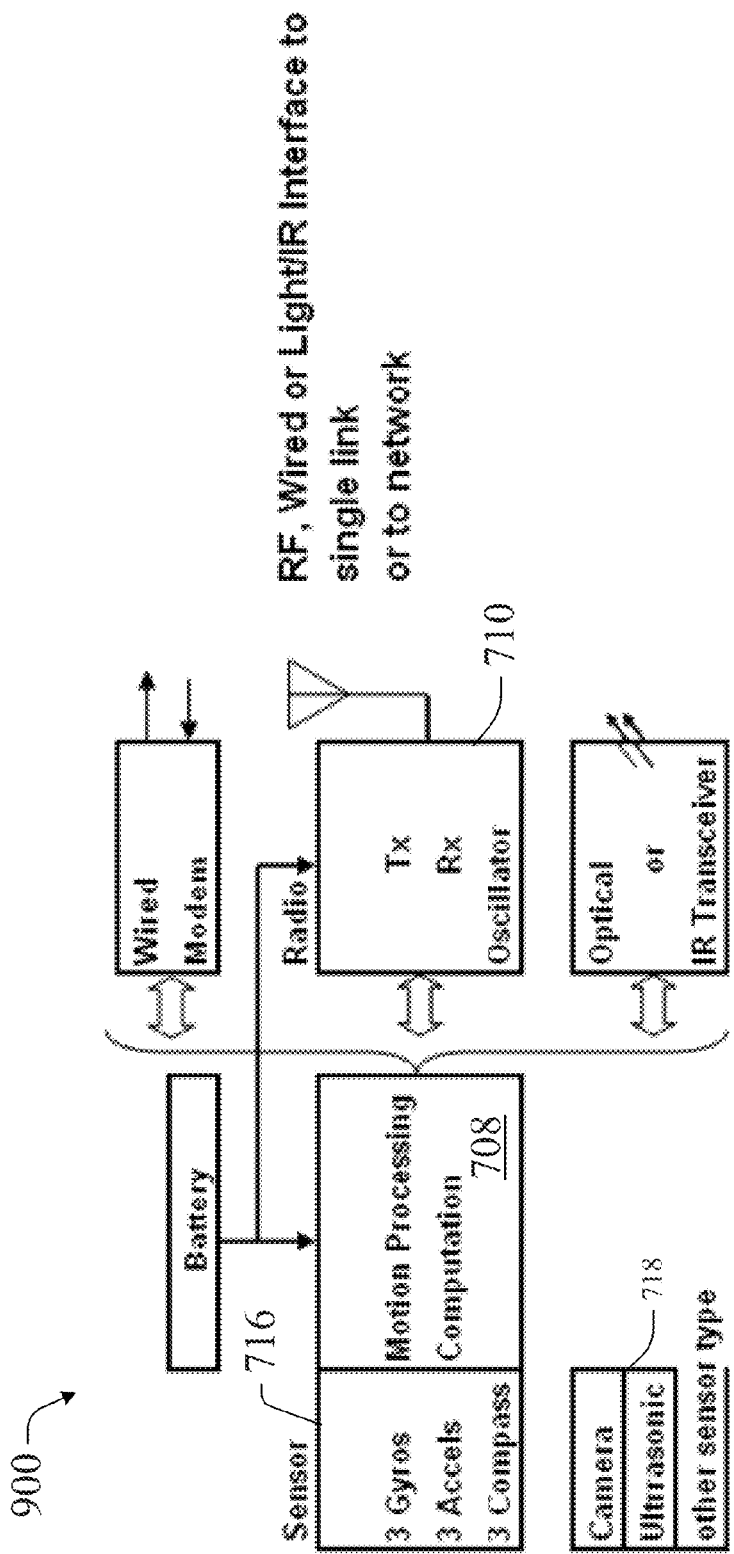

FIGS. 5, 6 and 7 illustrate various configurations for implementing the motion processing intelligence. In the embodiment illustrated in FIG. 5, in the node 500, a portion of the motion processing computation unit 508A is implemented inside the inertial sensors module 516 and another portion of the motion processing computation unit 508B is implemented inside the radio IC 510. The inertial sensors module 516 includes a 3-axis gyroscope and a 3-axis accelerometer. In the embodiment illustrated in FIG. 6, in the node 600, a portion of the motion processing computation unit 608A is implemented inside the inertial sensors module 616 and another portion of the motion processing computation unit 608B is implemented inside the radio IC 610. The inertial sensors module 616 includes a 3-axis gyroscope, a 3-axis accelerometer and a 3-axis compass, i.e. a 9-axis sensor. In the embodiment illustrated in FIG. 7, in the node 700, the motion processing computation unit 708 is implemented entirely inside the inertial sensors module 716. The radio IC 710 does not include any motion processing intelligence. The node 700 also includes other non-inertial motion sensors 718 including a camera and an ultrasonic sensor.

Figure 8:
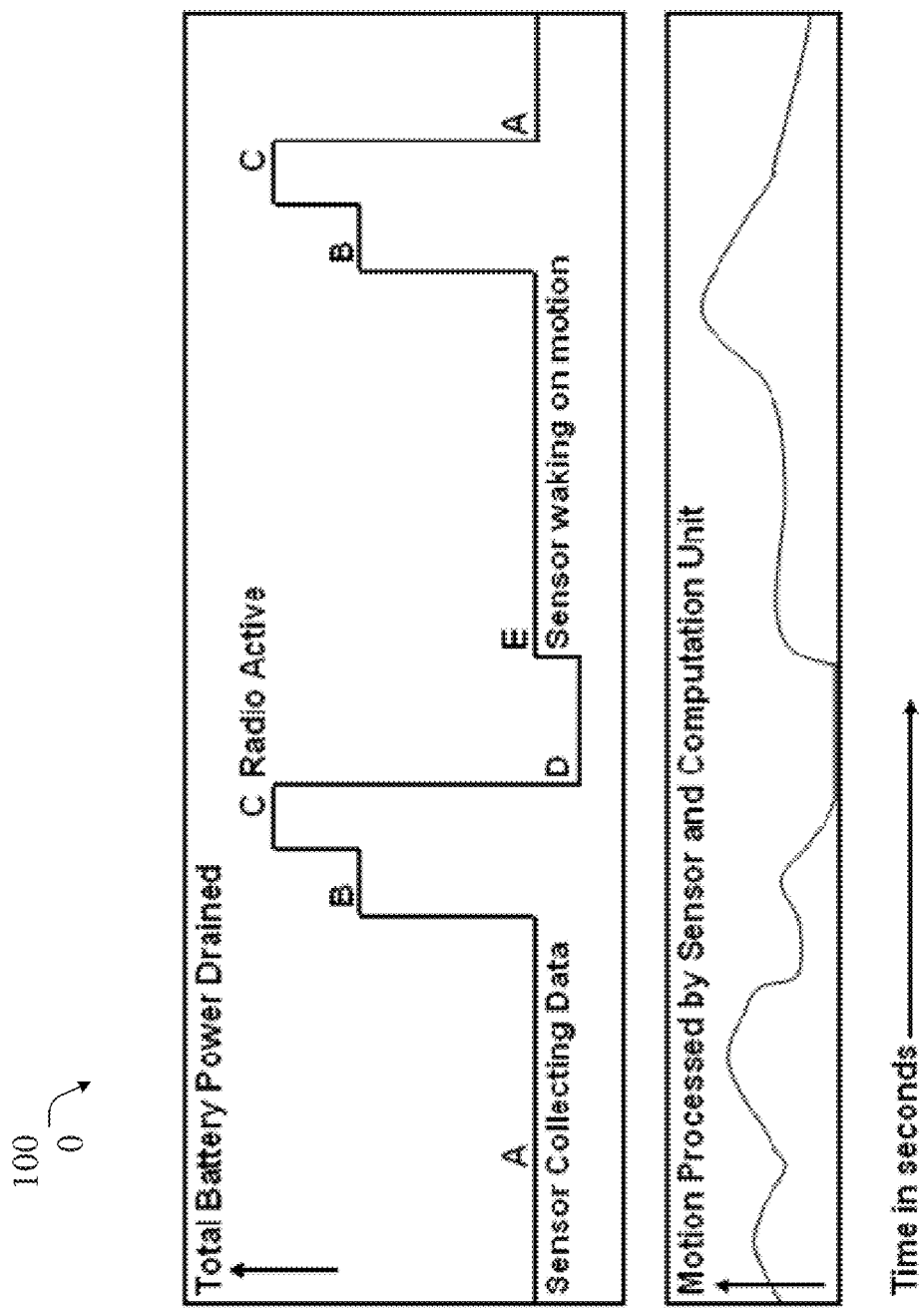
FIG. 8 illustrates an exemplary power management technique of the present invention.

FIG. 8 illustrates an exemplary timing diagram 800, in which the total battery power drained that is drained is shown for various activities. Period A represents the time during which the inertial sensors are collecting and processing motion-related data, and the results of the data collection and/or processing is being stored in the FIFO. Period B illustrates the time during which the inertial sensors are waking up the radio IC, i.e. switching the radio IC to its active state or mode, in response to the FIFO data becoming available. Period C represents the time during which the FIFO data is being transferred to the radio IC, and during which the radio IC transmitting or receiving data. Period D represents the time during which the computation unit is placing the radio IC and the inertial sensors into the low power standby mode, i.e., during a period of very little or no motion. Period E illustrates the time during which the inertial sensors are waking up to normal active mode of operation upon sensing significant motion. As can be seen from the timing diagram 800, a lot of power is drained during the periods B and C, and the computation unit of the present invention enhances power management by reducing the time during which the radio IC is operating in the high power active mode by properly utilizing the FIFO buffer.

Figure 9:
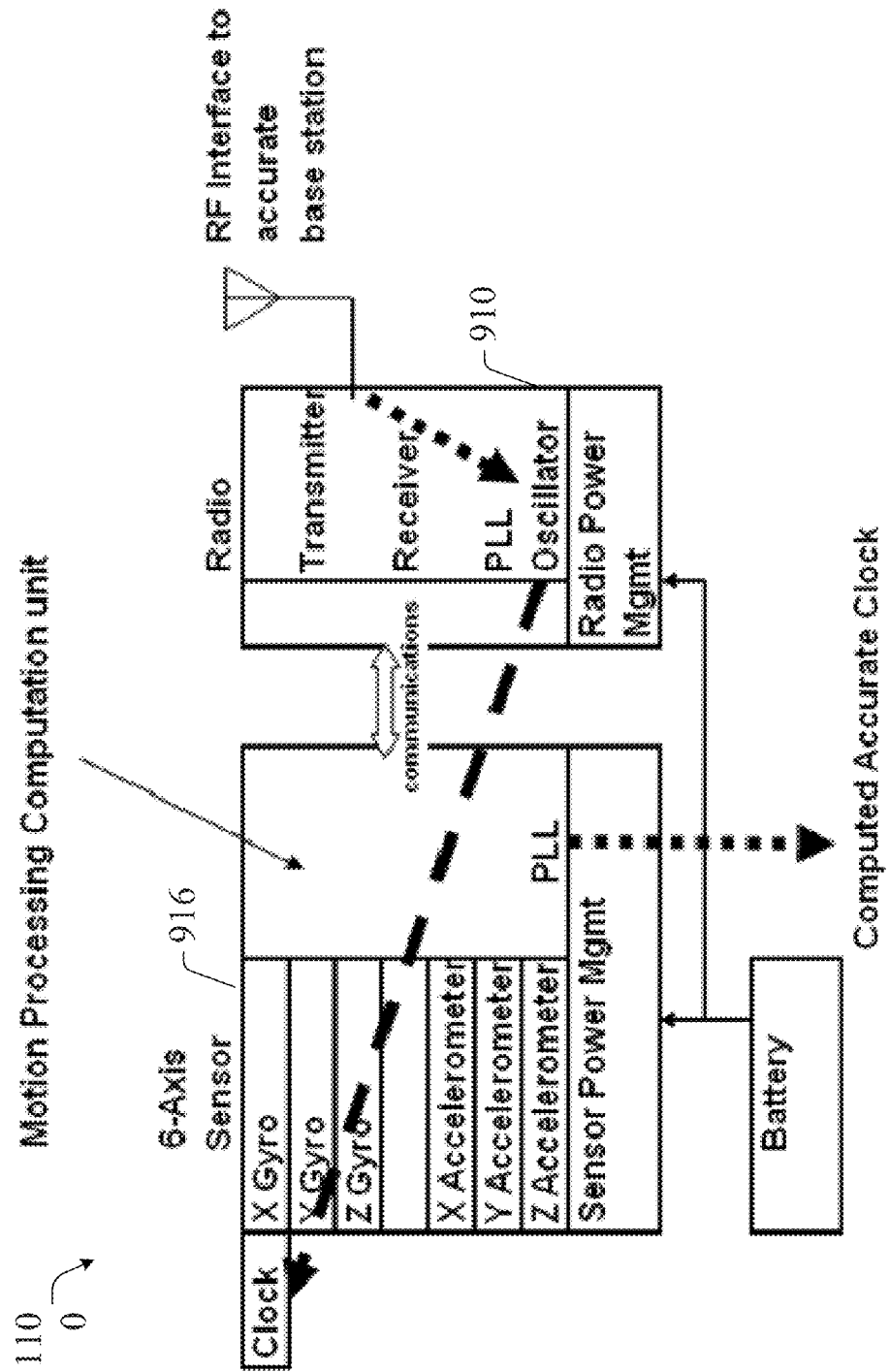
FIG. 9 illustrates an exemplary clock calibration technique of the present invention.

FIG. 9 illustrates an exemplary scenario for providing an accurate system clock to the node 900. The accurate clocking for the sensor module 916 is provided by alignment of the sensor module's clock to the reference frequency information received from the RF base station (via the radio IC 910). The dotted line arrows illustrate the clock signal flow. In the embodiment of FIG. 9, the radio IC 910 can have a local oscillator that is only accurate enough to receive the base station RF signal. The radio IC 910 aligns its oscillator to the accurate base station frequency. The sensor module 916 aligns its x-axis gyro oscillator to the accurate base station frequency, via the radio IC 910. The sensor module 916 can then provide a computed accurate clock output to the local electronic system.

According to an aspect of the present invention, the inertial sensors can be used as replacements for push buttons in handheld devices. For example, the inertial sensors can replace the push button for turning on the backlight of a watch. Specifically, the inertial sensors embedded in a watch can turn on the backlight of the watch upon detecting a predetermined (or pre-programmed) movement of the watch. The predetermined movement can include, for example, shaking of the watch three times. The inertial sensors can also replace push buttons that are used for turning on the display or waking up application programs including a radio IC in handheld devices. The hand gestures can act as equivalents of push buttons. Moreover, upon not detecting any motion (or significant motion) of the handheld device for a predetermined amount of time, the inertial sensors can cause the handheld device to enter into the sleep mode. In some embodiments, the handheld devices do not include any push buttons and instead rely upon recognizing the commands associated with various hand gestures for carrying out various functions and tasks. Examples of such devices include, but are not limited to, video gaming remote controllers, watches and handheld musical devices that do not include any push buttons. In these examples, the users hand gestures are interpreted by the handheld device and corresponding commands are executed to cause an event in the video game to occur, to turn on the backlight of the watch, or cause the musical device to play a particular song.

Exemplary Networked and Distributed Environments

One of ordinary skill in the art can appreciate that the various embodiments of methods and devices for pointing based services and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 10:
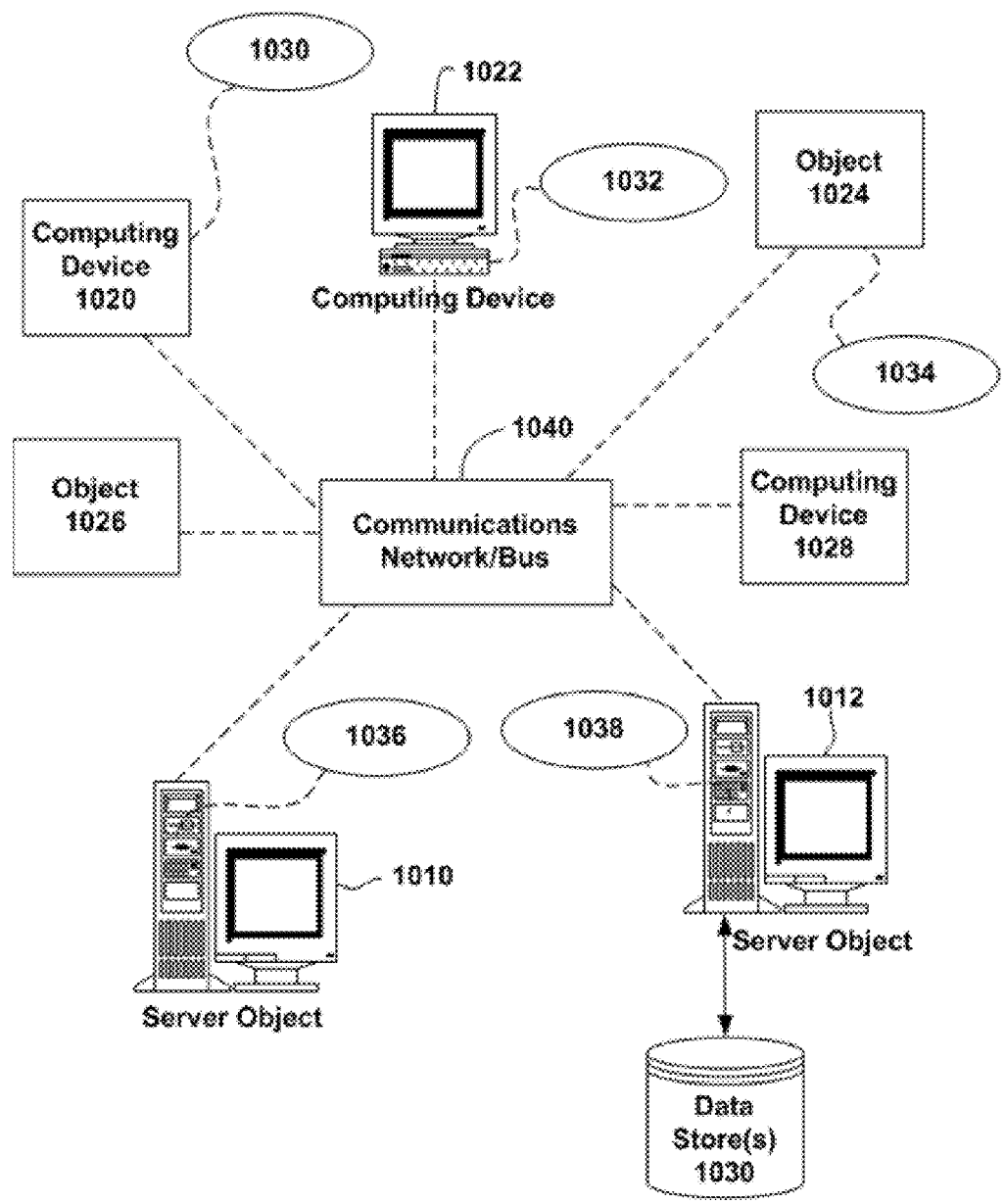
FIG. 10 illustrates an exemplary computer network in which the present invention can be implemented.

FIG. 10 provides a non-limiting schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that objects 1010, 1012, etc. and computing objects or devices 1020, 1022, 1024, 1026, 1028, etc. may comprise different devices, such as remote controllers, PDAs, audio/video devices, mobile phones, MP3 players, laptops, etc.

Each object 1010, 1012, etc. and computing objects or devices 1020, 1022, 1024, 1026, 1028, etc. can communicate with one or more other objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each object 1010, 1012, etc. or 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the delayed interaction model as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 10, as a non-limiting example, computers 1020, 1022, 1024, 1026, 1028, etc. can be thought of as clients and computers 1010, 1012, etc. can be thought of as servers where servers 1010, 1012, etc. provide data services, such as receiving data from client computers 1020, 1022, 1024, 1026, 1028, etc., storing of data, processing of data, transmitting data to client computers 1020, 1022, 1024, 1026, 1028, etc., although any computer can be considered a client, a server, or both, depending on the circumstances. Any of these computing devices may be processing data, or requesting services or tasks that may implicate the delayed interaction model and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the direction based services can be provided standalone, or distributed across multiple computing devices or objects.

In a network environment in which the communications network/bus 1040 is the Internet, for example, the servers 1010, 1012, etc. can be Web servers with which the clients 1020, 1022, 1024, 1026, 1028, etc. communicate via any of a number of known protocols, such as the hypertext transfer protocol (HTTP). Servers 1010, 1012, etc. may also serve as clients 1020, 1022, 1024, 1026, 1028, etc., as may be characteristic of a distributed computing environment.

Exemplary Computing Device

As mentioned, various embodiments described herein apply to any device wherein it may be desirable to perform pointing based services, and delay interactions with points of interest. It should be understood, therefore, that handheld, portable and other computing devices and computing objects of all kinds are contemplated for use in connection with the various embodiments described herein, i.e., anywhere that a device may request pointing based services. Accordingly, the general purpose remote computer described below in FIG. 11 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such as client workstations, servers or other devices. Those skilled in the art will appreciate that network interactions may be practiced with a variety of computer system configurations and protocols.

Figure 11:
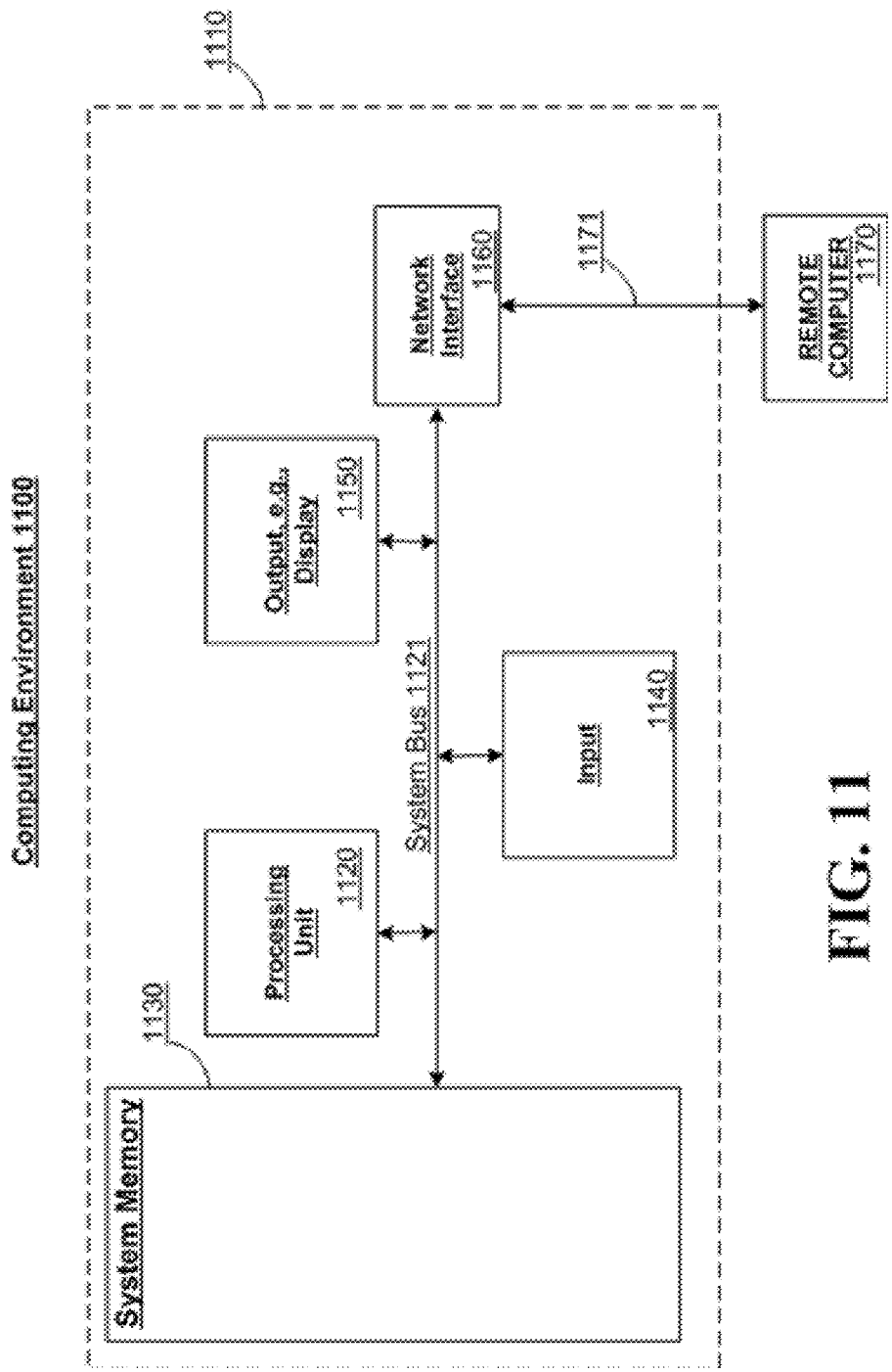
FIG. 11 illustrates an exemplary computing environment in which the present invention can be implemented.

FIG. 11 thus illustrates an example of a suitable computing system environment 1100 in which one or more of the embodiments may be implemented, although as made clear above, the computing system environment 1100 is only one example of a suitable computing environment and is not intended to suggest any limitation as to the scope of use or functionality of any of the embodiments. Neither should the computing environment 1100 be interpreted as having any dependency or requirement relating to any one or combination of components illustrated in the exemplary operating environment 1100.

With reference to FIG. 11, an exemplary remote device for implementing one or more embodiments herein can include a general purpose computing device in the form of a handheld computer 1110. Components of handheld computer 1110 may include, but are not limited to, a processing unit 1120, a system memory 1130, and a system bus 1121 that couples various system components including the system memory to the processing unit 1120.

Computer 1110 typically includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user may enter commands and information into the computer 1110 through input devices 1140. A monitor or other type of display device is also connected to the system bus 1121 via an interface, such as output interface 1150. In addition to a monitor, computers may also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1171, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to derive information about surrounding points of interest.

There are multiple ways of implementing one or more of the embodiments described herein, e.g., an appropriate API, tool kit, driver code, operating system, control, standalone or downloadable software object, etc. which enables applications and services to use the pointing based services. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A handheld device, comprising:
a sensor component configured to generate, based on a data sampling rate, data in response to detection of a movement of the handheld device using sensors comprising a 3-axis angular rate sensor and a 3-axis linear acceleration sensor;
a processor component configured to:
adaptively adjust the data sampling rate based on a determination that the movement satisfies a condition with respect to an amount of motion of the handheld device, wherein the data sampling rate adaptively increases as the amount of motion increases, and wherein the data sampling rate adaptively decreases as the amount of motion decreases;
determines, based on the condition, different power states for different portions of the sensors associated with different axes of the handheld device;
adjust the data sampling rate based on an expected movement;
process portions of the data to obtain processed data; and
send the processed data directed to a base station via a wireless network, the processed data being a digital word and time stamp, wherein the digital word identifies a predefined gesture or movement.

2. The handheld device of claim 1, further comprising a remote controller device associated with a video gaming system.

3. The handheld device of claim 1, wherein the processor component and the sensor component are included in a common substrate.

4. The handheld device of claim 1, wherein the processor component is further configured to combine portions of the data to generate at least one of a data matrix or a quaternion.

5. The handheld device of claim 1, further comprising: a clock component configured to generate a first clock and calibrate the first clock based on a second clock associated with a base station device.

6. The handheld device of claim 1, wherein the data comprises digital word information corresponding to a predefined gesture, and wherein the sensor component is further configured to generate an interrupt signal based on the movement.

7. The handheld device of claim 1, wherein the processor component is further configured to compress the data using a linear or a non-linear digital bandwidth compression algorithm.

8. The handheld device of claim 1, wherein the processor component is further configured to combine outputs of at least six of the sensors to generate a data matrix or a quaternion.

9. The handheld device of claim 2, wherein the processor component is further configured to process motion sensing data associated with another remote controller device associated with the video gaming system to obtain processed data.

10. A wireless system, comprising:
a memory to store instructions; and
a processor, coupled to the memory, that facilitates execution of the instructions to at least:
detect, based on a data sampling rate associated with an inertial sensor component comprising a multi-axis gyroscope and a multi-axis accelerometer, a hand movement or a gesture;
adaptively modify the data sampling rate based on a determination that the hand movement or the gesture satisfies a condition with respect to an amount of movement of the wireless system, wherein the data sampling adaptively increases in response to detection of an increase in the amount of movement of the wireless system, and wherein the data sampling rate adaptively decreases in response to detection of a decrease in the amount of movement of the wireless system;
determine, based on the condition, different power states for different portions of the inertial sensor component associated with different axes of the inertial sensor component;
change the data sampling rate in response to determining that lack of movement satisfies a third condition with respect to the lack of movement of the system;
process, by the system, portions of the data to obtain processed data; and
send, by the system utilizing a transmitter-receiver integrated circuit component, the processed data directed to a base station via a wireless network, the processed data being a digital word and time stamp, wherein the digital word identifies a predefined gesture or movement.

11. The wireless system of claim 10, wherein the processor further facilitates the execution of the instructions to:
operate in a sleep mode or an active mode in response to detection of the hand movement or the gesture.

12. The wireless system of claim 10, wherein the processor further facilitates the execution of the instructions to:
associate, via a programmable controller component, the hand movement or the gesture with a command or a function.

13. The wireless system of claim 10, further comprising:
at least one of a watch, a remote controller, or a music player.

14. A method, comprising:
generating, by a system comprising a processor based on a sampling rate, data related to a movement of the system using a sensor component comprising a 3-axis gyroscope and a 3-axis accelerometer;
adaptively increasing the sampling rate in response to determining that the movement satisfies a first condition with respect to an increase in an amount of the movement of the system;
adaptively decreasing the sampling rate in response to determining that the movement satisfies a second condition with respect to a decrease in the amount of the movement of the system; and
determining, based on the condition, different power states for different portions of the sensor component associated with different axes of the system;
changing the sampling rate in response to determining that lack of movement satisfies a third condition with respect to the lack of movement of the system;
processing, by the system, portions of the data to obtain processed data; and
sending, by the system utilizing a transmitter-receiver integrated circuit component, the processed data directed to a base station via a wireless network, the processed data being a digital word and time stamp, wherein the digital word identifies a predefined gesture or movement.

15. The method of claim 14, further comprising:
transitioning between a sleep mode and an active mode in response to detecting, by the system, the movement.

16. The method of claim 14, wherein the sampling rate is directly proportional to a speed of the movement.

17. The method of claim 14, further comprising:
combining, by the system, portions of the data into a 4-dimensional quaternion format to obtain processed data.

18. The handheld device of claim 1, wherein the sensor component and the processor component are included in an integrated circuit of the handheld device.

19. The handheld device of claim 1, further comprising a wireless transmitter-receiver component configured to wirelessly send, based on the data, information directed to a device.

20. The handheld device of claim 9, further comprising a transmitter-receiver component configured to wirelessly receive, based on the processed data, information from a base station device and sends the information directed to the other remote controller device.

21. The wireless system of claim 10, further comprising an enclosure that does not include a pushbutton or a switch.

22. The handheld device of claim 19, wherein the wireless transmitter-receiver component is configured to switch from a low power state to an active state in response to a detection of the movement.

23. The handheld device of claim 1, further comprising:
a memory that stores at least a portion of the data as stored data; and
a transmitter-receiver component that wirelessly send the stored data directed to a device in response to a determination that the handheld device is within a wireless coverage range of a network device.

24. The handheld device of claim 2, further comprising a transmitter-receiver component configured to wirelessly send, based on the data, information directed to another remote controller device associated with the video gaming system.

25. The handheld device of claim 9, wherein the transmitter-receiver component wirelessly sends the processed data directed to a base station device.

26. The method of claim 14, further comprising:
processing, by the system, portions of the data to obtain processed data; and
sending, by the system utilizing a transceiver-receiver integrated circuit component, the processed data directed to a base station device via a wireless network device.

* * * * *